United States Patent
Huang et al.

(10) Patent No.: US 10,926,414 B2
(45) Date of Patent: Feb. 23, 2021

(54) SYSTEM AND METHOD FOR CALIBRATING TOOL CENTER POINT OF ROBOT

(71) Applicant: INDUSTRIAL TECHNOLOGY RESEARCH INSTITUTE, Hsin-Chu (TW)

(72) Inventors: Cheng-Kai Huang, Taichung (TW); Yeou-Bin Guu, Taichung (TW); Yi-Len Chen, Yilan County (TW); Chwen-Yi Yang, Hualien County (TW); Jan-Hao Chen, Changhua County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 392 days.

(21) Appl. No.: 15/845,168

(22) Filed: Dec. 18, 2017

(65) Prior Publication Data

US 2019/0099887 A1    Apr. 4, 2019

(30) Foreign Application Priority Data

Sep. 29, 2017    (TW) .................................. 106133775

(51) Int. Cl.
*B25J 9/16* (2006.01)
*G01B 11/00* (2006.01)
(Continued)

(52) U.S. Cl.
CPC .......... *B25J 9/1692* (2013.01); *G01B 11/005* (2013.01); *G01B 21/042* (2013.01);
(Continued)

(58) Field of Classification Search
CPC . B25J 9/1692; B25J 19/0095; G05B 19/4086; G05B 19/4083;
(Continued)

(56) References Cited

U.S. PATENT DOCUMENTS 4,453,085 A * 6/1984 Pryor .................... B25J 18/002
                                                    250/203.1
5,321,353 A    6/1994 Furness
(Continued)

FOREIGN PATENT DOCUMENTS

CN    100398274 C    7/2008
CN    102909728 A    2/2013
(Continued)

OTHER PUBLICATIONS

Mendoza Thesis (Year: 2012).*
(Continued)

*Primary Examiner* — Jeff A Burke
*Assistant Examiner* — Kyle T Johnson
(74) *Attorney, Agent, or Firm* — Locke Lord LLP; Tim Tingkang Xia, Esq.

(57) ABSTRACT

A system for calibrating tool center point of robot is provided, which may include a first image sensor, a second image sensor, and a controller. The first image sensor may have a first image central axis. The second image sensor may have a second image central axis not parallel to the first image central axis, and intersect the first image central axis at an intersection point. The controller may control a robot to repeatedly move a tool center point thereof between the first and the second image central axis. The controller may record a calibration point including the coordinates of the joints of the robot when the tool center point overlaps the intersection point, and then move the tool center point and repeat the above steps to generate several calibration points, whereby the controller may calculate the coordinate of the tool center point according to the calibration points.

24 Claims, 8 Drawing Sheets

(51) Int. Cl.
*G01B 21/04* (2006.01)
*G05B 19/408* (2006.01)

(52) U.S. Cl.
CPC ..... *G05B 19/4083* (2013.01); *G05B 19/4086* (2013.01); *G05B 2219/39007* (2013.01); *G05B 2219/39016* (2013.01); *G05B 2219/40611* (2013.01)

(58) Field of Classification Search
CPC ........... G05B 2219/39016; G05B 2219/39007; G05B 2219/40611; G01B 11/005; G01B 21/042
See application file for complete search history.

(56) References Cited

U.S. PATENT DOCUMENTS

| | | | |
|---|---|---|---|
| 5,767,648 A * | 6/1998 | Morel | B25J 9/1628 |
| | | | 318/568.1 |
| 5,929,584 A | 7/1999 | Gunnarsson et al. | |
| 6,044,308 A | 3/2000 | Huissoon | |
| 6,301,763 B1 | 10/2001 | Pryor | |
| 6,728,582 B1 * | 4/2004 | Wallack | G05B 19/41875 |
| | | | 700/64 |
| 6,941,192 B2 | 9/2005 | Tang et al. | |
| 7,684,898 B2 | 3/2010 | Pagel et al. | |
| 8,457,790 B2 | 6/2013 | Blondel et al. | |
| 8,798,794 B2 | 8/2014 | Walser et al. | |
| 9,002,516 B2 | 4/2015 | Chiu et al. | |
| 9,043,024 B2 | 5/2015 | Chiu et al. | |
| 9,050,728 B2 | 6/2015 | Ban et al. | |
| 9,517,560 B2 | 12/2016 | Amano | |
| 2003/0220756 A1 | 11/2003 | Stengele | |
| 2007/0036460 A1 * | 2/2007 | Koch | G06T 3/60 |
| | | | 382/276 |
| 2008/0188986 A1 * | 8/2008 | Hoppe | B25J 9/1692 |
| | | | 700/263 |
| 2009/0107485 A1 * | 4/2009 | Reznik | G01S 3/7861 |
| | | | 126/600 |
| 2009/0118864 A1 * | 5/2009 | Eldridge | B25J 9/1692 |
| | | | 700/259 |
| 2011/0074674 A1 * | 3/2011 | Walberg | G06F 3/0428 |
| | | | 345/158 |
| 2013/0010081 A1 * | 1/2013 | Tenney | A61B 34/30 |
| | | | 348/47 |
| 2013/0035791 A1 * | 2/2013 | Chiu | B25J 9/1692 |
| | | | 700/253 |
| 2014/0365007 A1 * | 12/2014 | Trompeter | B25J 9/1692 |
| | | | 700/254 |
| 2015/0142171 A1 | 5/2015 | Li et al. | |
| 2016/0046023 A1 * | 2/2016 | Nagendran | B25J 9/1689 |
| | | | 700/248 |
| 2016/0071272 A1 * | 3/2016 | Gordon | G01B 11/245 |
| | | | 348/48 |
| 2016/0220404 A1 * | 8/2016 | Fogelberg | A61F 4/00 |
| 2017/0051671 A1 | 2/2017 | Chalaud | |
| 2017/0113351 A1 | 4/2017 | Yoshino | |
| 2017/0178379 A1 * | 6/2017 | Fu | A43B 9/00 |
| 2019/0022867 A1 * | 1/2019 | Deng | B25J 9/1692 |
| 2019/0099887 A1 * | 4/2019 | Huang | G01B 21/042 |
| 2019/0212139 A1 * | 7/2019 | Allen | G01B 11/16 |

FOREIGN PATENT DOCUMENTS

| | | |
|---|---|---|
| CN | 103101060 A | 5/2013 |
| CN | 103209809 A | 7/2013 |
| CN | 103706945 A | 4/2014 |
| CN | 104345688 A | 2/2015 |
| CN | 105066884 A | 11/2015 |
| CN | 105818167 A | 8/2016 |
| CN | 106462140 A | 2/2017 |
| CN | 105437230 B | 8/2017 |
| EP | 0114505 A1 | 8/1984 |
| JP | 11123678 A * | 5/1999 |
| JP | 3186797 B2 | 7/2001 |
| JP | 2003117861 A | 4/2003 |
| TW | 201117935 A | 6/2011 |
| TW | 201221801 A | 6/2012 |
| TW | 201411011 A | 3/2014 |
| TW | 201420290 A | 6/2014 |
| TW | 201618910 A | 6/2016 |
| TW | 201702034 A | 1/2017 |
| TW | 201716899 A | 5/2017 |
| TW | I587996 B | 6/2017 |
| WO | 03033219 A2 | 4/2003 |
| WO | 2012076038 A1 | 6/2012 |

OTHER PUBLICATIONS

Prior Art Search History (Year: 2020).*
Perception for Robotics (Year: 2019).*
Changjie Liu et al., Calibration method of TCP based on stereo vision robot, Infrared and Laser Engineering, 2015, vol. 44, No. 6, 1912-1917.
Frank Shaopeng Cheng, Calibration of robot reference frames for enhanced robot positioning, Robot Manipulators, 2008.
Christof Borrmann et al., Enhanced calibration of robot tool center point using analytical algorithm, International Journal of Materials Science and Engineering, 2015, vol. 3, No. 1, 12-18.
Yin, Shibin et al., Fast Recovery Technology of Tool Center Point in Robotic Visual Measurement System, ROBOT, 2013, vol. 35, No. 6, 736-743.
Gustav Bergström, Method for calibration of off-line generated robot program, Chalmers, Master of Science Thesis, 2011.
Johan Hallenberg, Robot Tool Center Point Calibration using Computer Vision, Linkoping University, Department of Electrical Engineering, 2007.
Taiwan Patent Office, "Office Action", dated Nov. 21, 2018, Taiwan.
China Patent Office, "Office Action", China, dated Mar. 25, 2020.

* cited by examiner

SYSTEM AND METHOD FOR CALIBRATING TOOL CENTER POINT OF ROBOT

CROSS REFERENCE TO RELATED APPLICATION

All related applications are incorporated by reference. The present application is based on, and claims priority from, Taiwan Application Serial Number 106133775, filed on Sep. 29, 2017, the disclosure of which is hereby incorporated by reference herein in its entirety.

TECHNICAL FIELD

The technical field relates to a system for calibrating tool center point of robot, in particular to an automatic system for calibrating tool center point of robot. The technical field further relates to the method of the system for calibrating tool center point of robot.

BACKGROUND

With advance of technology, the industrial manipulators are more widely used to various industries. In general, the most frequently used industrial manipulator is articulated robotic arm, which has several joints. One end of the robotic arm is installed with a tool, such as welding tool or drilling tool, in order to perform various operations. The tool center point (TCP) of the tool of the robotic arm should be precisely calibrated in advance before the robotic arm starts an operation. Then, the controller of the robotic arm can control the tool according to the tool center point to move the tool in the correct path.

SUMMARY

An embodiment of the present disclosure relates to a system for calibrating tool center point of industrial manipulator (hereinafter "robot"). The system includes a first image sensor, a second image sensor and a controller. The first image sensor includes a first image central axis. The second image sensor includes a second image central axis intersecting the first image axis at an intersection point. The controller can control a robot to repeatedly move the tool center point of the tool thereof between the first image central axis and the second image central axis until the tool center point overlaps the intersection point. The controller can record a calibration point including the coordinates of the joints of the robot when the tool center point overlaps the intersection point, and move the tool center point and repeat the above steps to generate a plurality of the calibration points in order to calculate the coordinate of the tool center point according to the calibration points.

Another embodiment of the present disclosure relates to a method for calibrating tool center point of robot. The method includes the following steps: providing a first image sensor having a first image central axis; providing a second image sensor having a second image central axis not parallel to the first image central axis and intersecting the first image central axis at an intersection point; controlling a robot to repeatedly move the tool center point of the tool thereof between the first image central axis and the second image central axis until the tool center point overlaps the intersection point, and recording a calibration point including the coordinates of the joints of the robot; moving the tool center point, and repeating the above steps to generate a plurality of the calibration points; and calculating the coordinate of the tool center point according to the calibration points.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 2A~FIG. 2C are from second to fourth schematic diagrams of the first embodiment.

FIG. 3A~FIG. 3C are from fifth to seventh schematic diagrams of the first embodiment.

FIG. 5~FIG. 7 are from first to third flow charts of the first embodiment.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
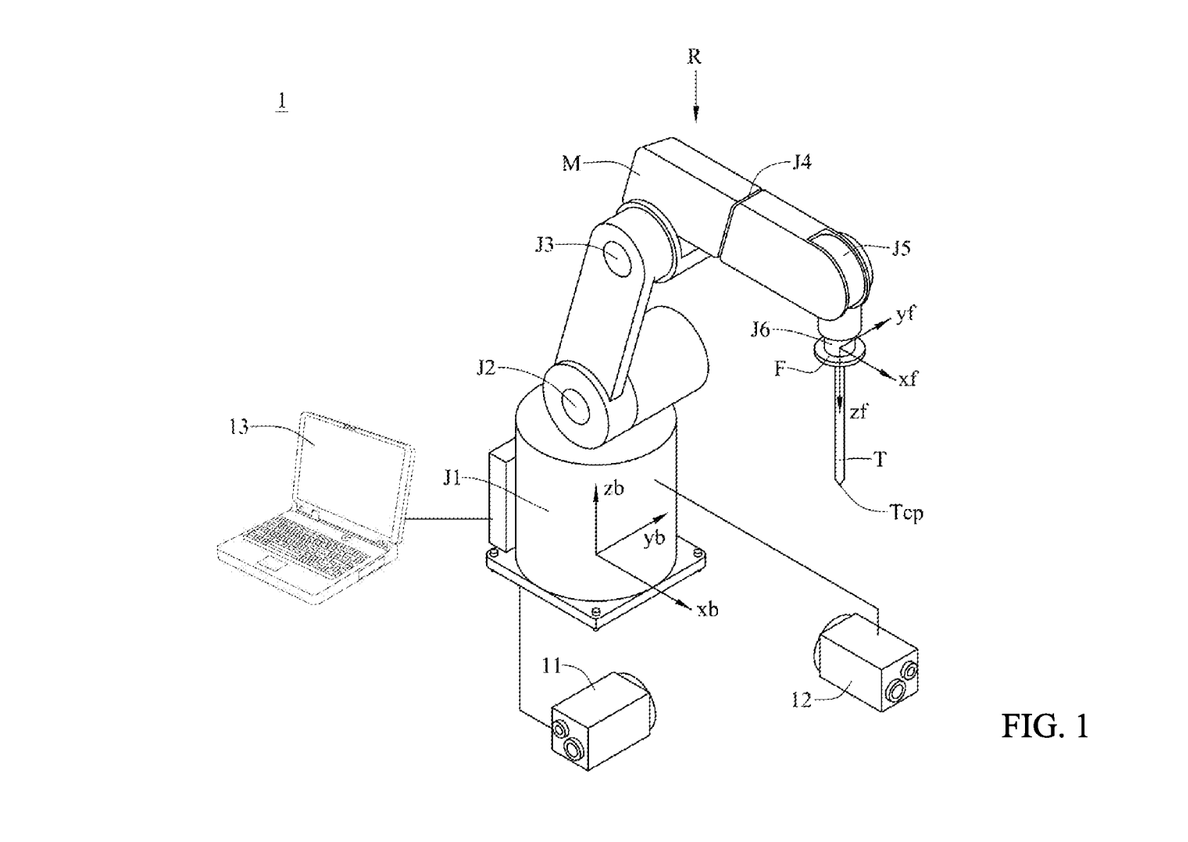
FIG. 1 is a first schematic diagram of a system for calibrating tool center point of robot of a first embodiment in accordance with the present disclosure.

FIG. 1, FIG. 2A~FIG. 2C, FIG. 3A~FIG. 3C and FIG. 4 are from first to eighth schematic diagrams of a system for calibrating tool center point of robot of a first embodiment in accordance with the present disclosure. As shown in FIG. 1, the system 1 for calibrating tool center point of robot includes a first image sensor 11, a second image sensor 12, and a controller 13. In an embodiment, the first image sensor 11 and the second image sensor 12 may be a camera or other similar devices. The robot R includes a main body M and a tool T disposed at one end of the main body M. Besides, the main body M includes a plurality of joints J1~J6. The system 1 for calibrating tool center point of robot can be used to calibrate the tool center point TCP of the tool T.

Figure 2A:
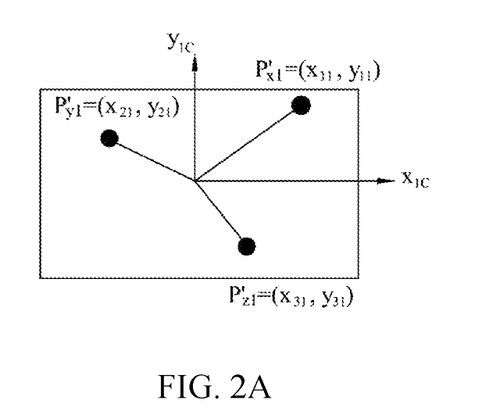
Figure 2B:
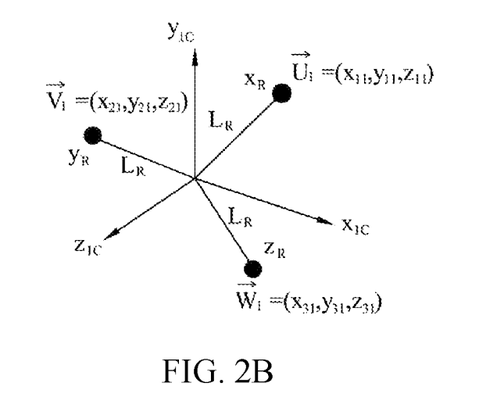
Figure 2C:
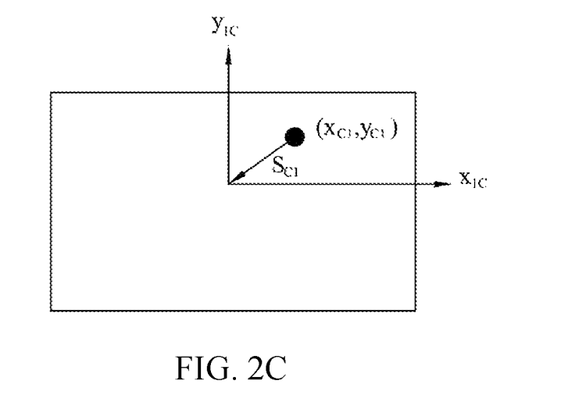

FIG. 2A shows the image of the first image sensor 11; FIG. 2B shows the relation between the space vectors and the coordinate system $(x_{1C}\text{-}y_{1C}\text{-}z_{1C})$ of the first image sensor 11; FIG. 2C shows the moving path that the tool center point TCP moves along the coordinate system $(x_{1C}\text{-}y_{1C}\text{-}z_{1C})$ of the first image sensor 11. As shown in FIG. 2A and FIG. 2B, the transformation relation between the coordinate system $(x_R\text{-}y_R\text{-}z_R)$ of the robot R and the coordinate system $(x_{1C}\text{-}y_{1C}\text{-}z_{1C})$ of the first image sensor 11 should be calculated before the calibration of the tool center point TCP.

The first step is to obtain the transformation relation between the coordinate system of the robot R and the coordinate system of the first image sensor 11. The controller 13 controls the robot R to move the tool center point TCP thereof, along the horizontal axis ($x_R$ axis) of the coordinate system of the robot R, from any position of the image overlapping area IA between the first image sensor 11 and the second image sensor 12 by a distance $L_R$ to obtain a projected coordinate point of the first image sensor 11. A first projected coordinate $P'_{x1}=(x_{11}, y_{11})$ is obtained from the first image sensor 11. Then, the first space vector $\vec{U_1}$ of the first projected coordinate can be assumed to be $\vec{U_1}=(x_{11}, y_{11}, z_{11})$, where $z_{11}$ is unknown.

Next, the controller 13 controls the robot R to move the tool center point TCP thereof, along the longitudinal axis ($y_R$ axis) of the coordinate system of the robot R, from the aforementioned position of the image overlapping area IA between the first image sensor 11 and the second image sensor 12 by the distance $L_R$ to obtain a projected coordinate point of the first image sensor 11. A second projected coordinate $P'_{y1}=(x_{21}, y_{21})$ is obtained from the first image sensor 11. Then, the second space vector $\vec{V_1}$ of the second projected coordinate can be assumed to be $\vec{V_1}=(x_{21}, y_{21}, z_{21})$, where $z_{21}$ is unknown.

Similarly, the controller 13 controls the robot R to move the tool center point TCP thereof, along the vertical axis ($z_R$ axis) of the coordinate system of the robot R, from the aforementioned position of the image overlapping area IA between the first image sensor 11 and the second image sensor 12 by the distance $L_R$ to obtain a projected coordinate point of the first image sensor 11. A third projected coordinate $P'_{z1}=(x_{31}, y_{31})$ is obtained from the first image sensor 11. Then, the third space vector $\vec{W_1}$ of the third projected coordinate can be assumed to be $\vec{W_1}=(x_{31}, y_{31}, z_{31})$, where $z_{31}$ is unknown.

As the space vectors $\vec{U_1}$, $\vec{V_1}$ and $\vec{W_1}$ are perpendicular to one another, so the controller 13 can calculate the space vectors $\vec{U_1}$, $\vec{V_1}$ and $\vec{W_1}$ according to Equation (1), Equation (2) and Equation (3):

$$\vec{U_1} \cdot \vec{V_1} = 0 \tag{1}$$

$$\vec{V_1} \cdot \vec{W_1} = 0 \tag{2}$$

$$\vec{U_1} \cdot \vec{W_1} = 0 \tag{3}$$

Finally, the controller 13 can obtain the transformation relation between the coordinate system ($x_R$-$y_R$-$z_R$) of the robot R and the coordinate system ($x_{1C}$-$y_{1C}$-$z_{1C}$) of the first image sensor 11, as shown in Equation (4):

$$S_R = \left[ \frac{\vec{U_1}}{\|\vec{U_1}\|} \quad \frac{\vec{V_1}}{\|\vec{V_1}\|} \quad \frac{\vec{W_1}}{\|\vec{W_1}\|} \right]^{-1} S_{C1} \tag{4}$$

In Equation (4), $S_{C1}$ stands for the movement amount that the tool center point TCP moves along the coordinate system ($x_{1C}$-$y_{1C}$-$z_{1C}$) of the first image sensor 11. As shown in FIG. 2C, $S_R$ stands for the movement amount that the tool center point TCP moves along the coordinate system ($x_R$-$y_R$-$z_R$) of the robot R.

Therefore, when moving the tool center point TCP of the robot R, the controller 13 can obtain the movement amount $S_{C1}$ from the images of the first image sensor 11. Then, the space vectors $\vec{U_1}$, $\vec{V_1}$ and $\vec{W_1}$ and the lengths $\|\vec{U_1}\|$, $\|\vec{V_1}\|$ and $\|\vec{W_1}\|$ thereof can be calculated according to Equations (1)~(3). The controller 13 obtains a matrix by dividing the space vectors $\vec{U_1}$, $\vec{V_1}$ and $\vec{W_1}$ by the lengths $\|\vec{U_1}\|$, $\|\vec{V_1}\|$ and $\|\vec{W_1}\|$ thereof respectively, and then multiply the inverse matrix of the aforementioned matrix by the movement amount $S_{C1}$ to obtain the movement amount $S_R$. The movement amount $S_R$ refers that the tool center point TCP moves along the coordinate system ($x_R$-$y_R$-$z_R$) of the robot R.

Figure 3A:
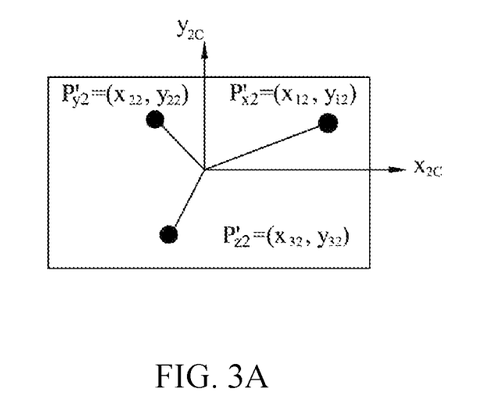
Figure 3B:
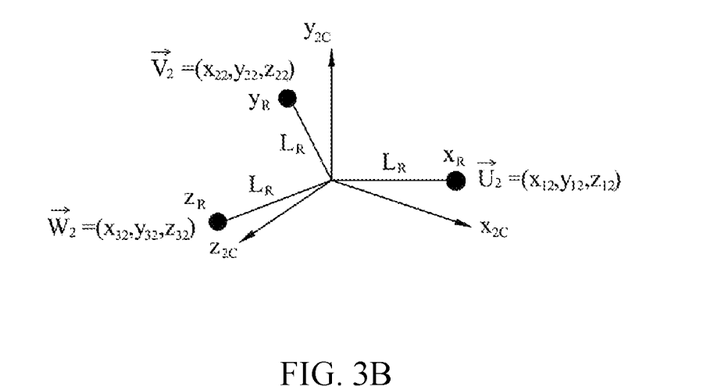
Figure 3C:
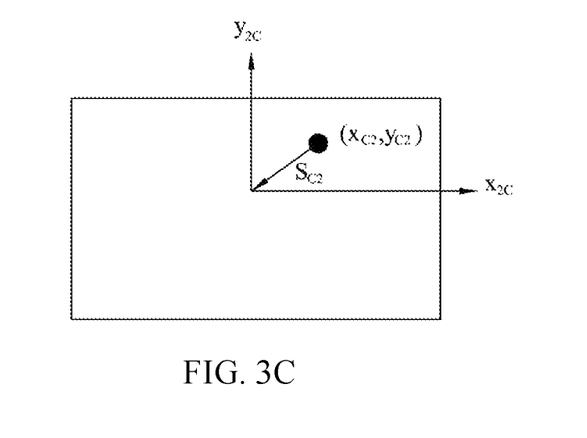

FIG. 3A shows the image of the second image sensor 12; FIG. 3B shows the relation between the space vectors and the coordinate system ($x_{2C}$-$y_{2C}$-$z_{2C}$) of the second image sensor 12; FIG. 3C shows the moving path that the tool center point TCP moves along the coordinate system ($x_{2C}$-$y_{2C}$-$z_{2C}$) of the second image sensor 12. As shown in FIG. 3A and FIG. 3B, the transformation relation between the coordinate system ($x_R$-$y_R$-$z_R$) of the robot R and the coordinate system ($x_{2C}$-$y_{2C}$-$z_{2C}$) of the second image sensor 12 should be calculated before the calibration of the too center point TCP.

The controller 13 controls the robot R to move the tool center point TCP thereof, along the horizontal axis ($x_R$ axis) of the coordinate system of the robot R, from any position of the image overlapping area IA between the first image sensor 11 and the second image sensor 12 by a distance $L_R$ to obtain a projected coordinate point of the second image sensor 12. A first projected coordinate $P'_{x2}=(x_{12}, y_{12})$ is obtained from the second image sensor 12. Then, the first space vector $\vec{U_2}$ of the first projected coordinate can be assumed to be $\vec{U_2}=(x\ y_{12}, z_{12})$, where $z_{12}$ is unknown.

Next, the controller 13 controls the robot R to move the tool center point TCP thereof, along the longitudinal axis ($y_R$ axis) of the coordinate system of the robot R, from the aforementioned position of the image overlapping area IA between the first image sensor 11 and the second image sensor 12 by the distance $L_R$ to obtain a projected coordinate point of the second image sensor 12. A second projected coordinate $P'_{y2}=(x_{22}, y_{22})$ is obtained from the first image sensor 11. Then, the second space vector $\vec{V_2}$ of the second projected coordinate can be assumed to be $\vec{V_2}=_{22}(x_{22}, y_{22}, z_{22})$, where $z_{22}$ is unknown.

Similarly, the controller 13 controls the robot R to move the tool center point TCP thereof, along the vertical axis ($z_R$ axis) of the coordinate system of the robot R, from the aforementioned position of the image overlapping area IA between the first image sensor 11 and the second image sensor 12 by the distance $L_R$ to obtain a projected coordinate point of the second image sensor 12. A third projected coordinate $P'_{z2}=(x_{32}, y_{32})$ is obtained from the second image sensor 12. Then, the third space vector $\vec{W_2}$ of the third projected coordinate can be assumed to be $\vec{W_3}=(x_{32}, y_{32}, z_{32})$, where $z_{32}$ is unknown.

As the space vectors $\vec{U_2}$, $\vec{V_2}$ and $\vec{W_2}$ are perpendicular to one another, so the controller 13 can calculate the space vectors $\vec{U_2}$, $\vec{V_2}$ and $\vec{W_2}$ according to Equation (5), Equation (6) and Equation (7):

$$\vec{U_2} \cdot \vec{V_2} = 0 \tag{5}$$

$$\vec{V_2} \cdot \vec{W_2} = 0 \tag{6}$$

$$\vec{U_2} \cdot \vec{W_2} = 0 \tag{7}$$

Finally, the controller 13 obtains the transformation relation between the coordinate system ($x_R$-$y_R$-$z_R$) of the robot R and the coordinate system ($x_{2C}$-$y_{2C}$-$z_{2C}$) of the second image sensor 12, as shown in Equation (8):

$$S_R = \left[\frac{\vec{U_2}}{\|\vec{U_2}\|} \quad \frac{\vec{V_2}}{\|\vec{V_2}\|} \quad \frac{\vec{W_2}}{\|\vec{W_2}\|}\right]^{-1} S_{C2} \quad (8)$$

In Equation (8), $S_{C2}$ stands for the movement amount that the tool center point TCP moves along the coordinate system ($x_{2C}$-$y_{2C}$-$z_{2C}$) of the second image sensor 12, as shown in FIG. 3C; $S_R$ stands for the movement amount that the tool center point TCP moves along the coordinate system ($x_R$-$y_R$-$z_R$) of the robot R.

Therefore, when moving the tool center point TCP of the robot R, the controller 13 can obtain the movement amount $S_{C2}$ from the images of the second image sensor 12. Then, the space vectors $\vec{U_2}$, $\vec{V_2}$ and $\vec{W_2}$ and the lengths $\|\vec{U_2}\|$, $\|\vec{V_2}\|$ and $\|\vec{W_2}\|$ thereof can be calculated according to Equations (5)~(7). The controller 13 can obtain a matrix by dividing the space vectors $\vec{U_2}$, $\vec{V_2}$ and $\vec{W_2}$ by the lengths $\|\vec{U_2}\|$, $\|\vec{V_2}\|$ and $\|\vec{W_2}\|$ thereof respectively, and then multiply the inverse matrix of the aforementioned matrix by the movement amount $S_{C2}$ to obtain the movement amount $S_R$. The movement amount $S_R$ refers that the tool center point TCP moves along the coordinate system ($x_R$-$y_R$-$z_R$) of the robot R.

In this way, the controller 13 can control the robot R to move the tool center point TCP thereof via visual servo control according to the transformation relation between the coordinate system ($x_R$-$y_R$-$z_R$) of the robot R and the coordinate system ($x_{1C}$-$y_{1C}$-$z_{1C}$) of the first image sensor 11, and the transformation relation between the coordinate system ($x_R$-$y_R$-$z_R$) of the robot R and the coordinate system ($x_{2C}$-$y_{2C}$-$z_{2C}$) of the second image sensor 12.

Figure 4:
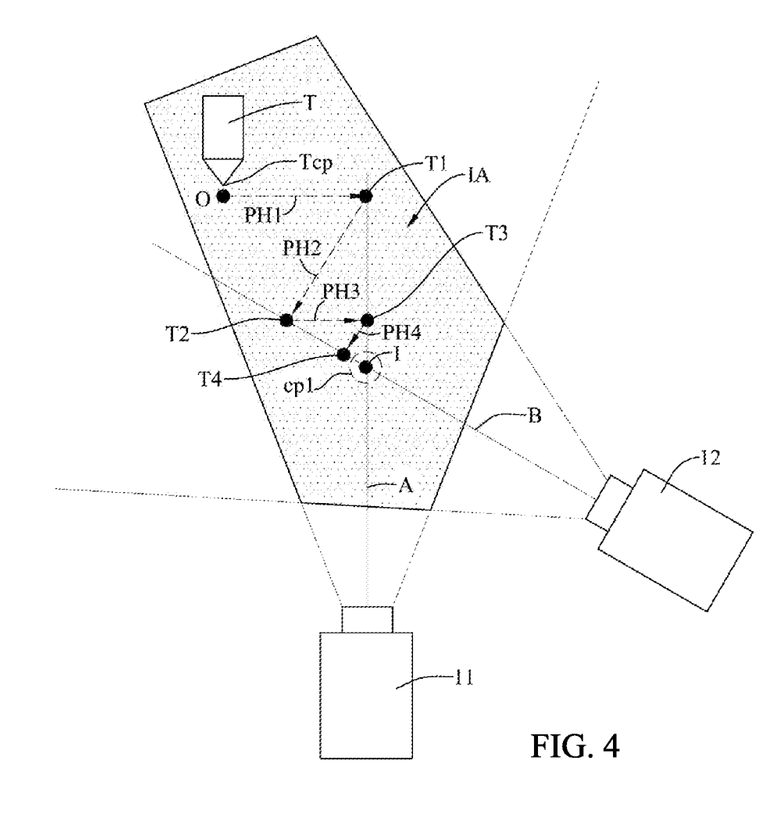
FIG. 4 is an eighth schematic diagram of the first embodiment.

As shown in FIG. 4, the first image sensor 11 has a first image central axis A; in an embodiment, the first image sensor 11 may be a camera or other similar devices.

The second image sensor 12 has a second image central axis B. The first image central axis A is not parallel to the second image axis B, and intersects the second image central axis B at an intersection point I. Besides, the first image sensor 11 and the second image sensor 12 have an image overlapping area IA, so the first image sensor 11 and the second image sensor 12 can provide a 2.5D machine vision. In another embodiment, the first image central axis A is substantially perpendicular to the second image central axis B. In an embodiment, the second image sensor 12 may be a camera or other similar devices.

The controller 13 controls the robot R to repeatedly move the tool center point TCP of the tool T thereof between the first image central axis A and the second image central axis B. In an embodiment, the controller 13 may be various computer devices. Then, the controller 13 records a calibration point when the tool center point TCP overlaps the intersection point I of the first image central axis A and the second image central axis B. Then the controller 13 changes the posture of the robot R to record next calibration point. In this way, the controller 13 can obtain a plurality of calibration points in different postures of the robot R. Finally, the controller 13 calculates the coordinate of the tool center point TCP according to the calibration points, where each calibration point includes the coordinates of the joints J1~J6. The coordinate of each joint is the rotation angle that the joint rotates relatively to a default initial point. For example, if the joint angle θ stands for the coordinate of a joint, the coordinates of the joints J1~J6 can be expressed as $\theta_{J1}$, $\theta_{J2}$, $\theta_{J3}$, $\theta_{J4}$, $\theta_{J5}$ and $\theta_{J6}$. Thus, a calibration point can be expressed as ($\theta_{J1}$, $\theta_{J2}$, $\theta_{J3}$, $\theta_{J4}$, $\theta_{J5}$, $\theta_{J6}$).

As shown in FIG. 4, the controller 13 controls the robot R to move the tool center point TCP thereof to an initial point O in the image overlapping area IA of the first image sensor 11 and the second image sensor 12. The initial point O may be any point in the image overlapping area IA. Then, the controller 13 controls the robot R to move the tool center point TCP toward the first image central axis A from the initial point O to the point T1, as shown by the path PH1. Afterward, the controller 13 controls the robot R to move the tool center point TCP toward the second image central axis B from the point T1 to the point T2, as shown by the path PH2. Similarly, the controller 13 controls the robot R to move the tool center point TCP toward the first image central axis A from the point T2 to the point T3, as shown by the path PH3. Then the controller 13 controls the robot R to move the tool center point TCP toward the second image central axis B from the point T3 to the point T4, as shown by the path PH4. Finally, the controller 13 controls the robot R to move the tool center point TCP toward the first image central axis A from the point T4 to the intersection point I, and records a first calibration point CP1 when the tool center point TCP overlaps the intersection point I. In the embodiment, when the distance between the tool center point TCP and the first image central axis A, and the distance between the tool center point TCP and the second image central axis B are less than a threshold value, the tool center point TCP is considered overlapping the intersection point I. In general, the threshold value is set as 50% of the pixels of the tool center point TCP. In other words, when the pixels of the tool center point TCP overlaps the first image central axis A and the second image central axis B at 50%, the tool center point TCP is considered overlapping the intersection point I. Of course, the aforementioned threshold value can be adjusted according to the size and the type of the tool T. As described above, the controller 13 can control the robot R to repeatedly move the tool center point TCP between the first image central axis A and the second image central axis B in order to obtain the first calibration point CP1.

Then, the controller 13 determines whether the number of the calibration points is greater or equal to a default value. In the embodiment, the number of the calibration points should be greater than or equal to 3. If the number of the calibration points is less than 3, the controller 13 generates an Euler angle increment $\Delta R_x$, $\Delta R_y$, $\Delta R_z$ by a random number generator to modify the Euler angle of the robot R in order to change the posture of the robot R. At the moment, the Euler angle of the robot R can be expressed as ($R_x+\Delta R_x$, $R_y \Delta R_y$, $R_z+\Delta R_z$), where ($R_x$, $R_y$, $R_z$) stands for the original Euler angle of the robot R, $R_x$ stands for a yaw angel, $R_y$ stands for a pitch angle and $R_z$ stands for a roll angel. If the modified Euler angle exceeds the motion range of the robot R or the image overlapping area IA, the controller 13 re-generates a new Euler angle increment by the random number generator.

Afterward, the controller 13 controls the robot R to repeatedly move the tool center point TCP thereof between the first image central axis A and the second image central axis B, and records a second calibration point CP2 when the tool center point TCP overlaps the intersection point I.

Next, the controller 13 determines whether the number of the calibration points is greater or equal to 3. If the controller 13 determines that the number of the calibration points is less than 3, the controller 13 repeats the above steps to obtain and record the third calibration point CP3 until the controller 13 determines that the number of the calibration points is greater or equal to 3.

As shown in FIG. 1, the controller 13 can calculate the coordinate of the tool center point TCP according to the calibration points CP1~CP3. The coordinate of each of the calibration points CP1~CP3 can be obtained according to the link rod parameters (Denavit-Hartenberg Parameters) of the robot R, the coordinates of the joints J1~J6 and the coordinate system $(x_f\text{-}y_f\text{-}z_f)$ of the tool center point TCP in relation to the flange facing F; more specifically, the link rod parameters include link offsets d, joint angles θ, link lengths a, and link twist angles α.

The coordinate of the tool center point TCP can be calculated according to Equation (9):

$$T_{1i}T_2 = P \quad (9)$$

In Equation (9), the matrix $T_{1i}$ stands for the 4×4 homogeneous transformation for transforming the $i^{th}$ calibration point from the coordinate system $(x_b\text{-}y_b\text{-}z_b)$ of the base to the coordinate system $(x_f\text{-}y_f\text{-}z_f)$ of the flange facing F. The matrix $T_2$ stands for the coordinate of the tool center point TCP in relation to the coordinate system of the flange facing F. The matrix P stands for the coordinate of the calibration point in relation to the coordinate system $(x_b\text{-}y_b\text{-}z_b)$ of the base in the space. Each calibration point can obtain 3 linear equations via Equation (9). Therefore, the coordinate of the tool center point TCP can be calculated by Pseudo-inverse matrix according to 2n equations obtained from n calibration points. Equation (10) is derived from Equation (9):

$$\begin{bmatrix} e_{11i} & e_{12i} & e_{13i} & e_{14i} \\ e_{21i} & e_{22i} & e_{23i} & e_{24i} \\ e_{31i} & e_{32i} & e_{33i} & e_{34i} \\ 0 & 0 & 0 & 1 \end{bmatrix} \begin{bmatrix} T_x \\ T_y \\ T_z \\ 1 \end{bmatrix} = \begin{bmatrix} P_x \\ P_y \\ P_z \\ 1 \end{bmatrix} \quad (10)$$

In Equation (10), the coordinate $(e_{11i}, e_{21i}, e_{31i})$ stands for the direction of the $x_f$-axis vector of the $i^{th}$ calibration point in relation to the coordinate system $(x_b\text{-}y_b\text{-}z_b)$ of the base. The coordinate $(e_{12i}, e_{22i}, e_{32i})$ stands for the direction of the $y_f$-axis vector of the $i^{th}$ calibration point in relation to the coordinate system $(x_b\text{-}y_b\text{-}z_b)$ of the base. The coordinate $(e_{13i}, e_{23i}, e_{33i})$ stands for the direction of the $z_f$-axis vector of the $i^{th}$ calibration point in relation to the coordinate system $(x_b\text{-}y_b\text{-}z_b)$ of the base. Equations (11)~(12) are derived from Equation (10):

$$\begin{bmatrix} e_{111} & e_{121} & e_{131} & -1 & 0 & 0 \\ e_{211} & e_{221} & e_{231} & 0 & -1 & 0 \\ e_{311} & e_{321} & e_{331} & 0 & 0 & -1 \\ e_{112} & e_{122} & e_{132} & -1 & 0 & 0 \\ e_{212} & e_{222} & e_{232} & 0 & -1 & 0 \\ e_{312} & e_{322} & e_{332} & 0 & 0 & -1 \\ e_{113} & e_{123} & e_{133} & -1 & 0 & 0 \\ e_{213} & e_{223} & e_{233} & 0 & -1 & 0 \\ e_{313} & e_{323} & e_{333} & 0 & 0 & -1 \end{bmatrix} \begin{bmatrix} T_x \\ T_y \\ T_z \\ P_x \\ P_y \\ P_z \end{bmatrix} = \begin{bmatrix} -e_{141} \\ -e_{241} \\ -e_{341} \\ -e_{142} \\ -e_{242} \\ -e_{342} \\ -e_{143} \\ -e_{243} \\ -e_{343} \end{bmatrix} \quad (11)$$

$$\begin{bmatrix} T_x \\ T_y \\ T_z \\ P_x \\ P_y \\ P_z \end{bmatrix} = T_3^t(T_3 T_3^t)^{-1} \begin{bmatrix} -e_{141} \\ -e_{241} \\ -e_{341} \\ -e_{142} \\ -e_{242} \\ -e_{342} \\ -e_{143} \\ -e_{243} \\ -e_{343} \end{bmatrix} \quad (12)$$

In Equation (10), $$T_3 = \begin{bmatrix} e_{111} & e_{121} & e_{131} & -1 & 0 & 0 \\ e_{211} & e_{221} & e_{231} & 0 & -1 & 0 \\ e_{311} & e_{321} & e_{331} & 0 & 0 & -1 \\ e_{112} & e_{122} & e_{132} & -1 & 0 & 0 \\ e_{212} & e_{222} & e_{232} & 0 & -1 & 0 \\ e_{312} & e_{322} & e_{332} & 0 & 0 & -1 \\ e_{113} & e_{123} & e_{133} & -1 & 0 & 0 \\ e_{213} & e_{223} & e_{233} & 0 & -1 & 0 \\ e_{313} & e_{323} & e_{333} & 0 & 0 & -1 \end{bmatrix},$$

where $T_3^t$ stands for the transpose matrix of $T_3$, and $(T_3 T_3^t)^{-1}$ stands for the inverse matrix of $(T_3 T_3^t)$.

If the number of the calibration points is sufficient and the matrix $T_{1i}$ corresponding to the given $i^{th}$ calibration point is obtained, Equation (12) can be derived by substituting all elements of the matrix into Equation (11) and then shifting the matrix $T_3$. After that, the coordinate $(T_x, T_y, T_z)$ of the tool center point TCP in relation to the coordinate system of the flange facing F, and the coordinate $(P_x, P_y, P_z)$ of the tool center point TCP in relation to the coordinate system $(x_R\text{-}y_R\text{-}z_R)$ of the robot R can be obtained. Finally, the calibration process of the tool center point TCP is finished.

The embodiment just exemplifies the present disclosure and is not intended to limit the scope of the present disclosure. Any equivalent modification and variation according to the spirit of the present disclosure is to be also included within the scope of the following claims and their equivalents.

As described above, in the embodiment, the system 1 for calibrating tool center point of robot can automatically calibrate the tool center point TCP of the robot R via visual servo control. The system 1 achieves high accuracy, which can effectively reduce labor cost and time waste. In addition, the system 1 for calibrating tool center point of robot can precisely calibrate the tool center point TCP of the robot R just by performing the calibration process for only one time, so the system 1 can more efficiently calibrate the tool center point TCP of the robot R. Thus, the system 1 for calibrating tool center point of robot can exactly improve the shortcomings of prior art.

Figure 5:
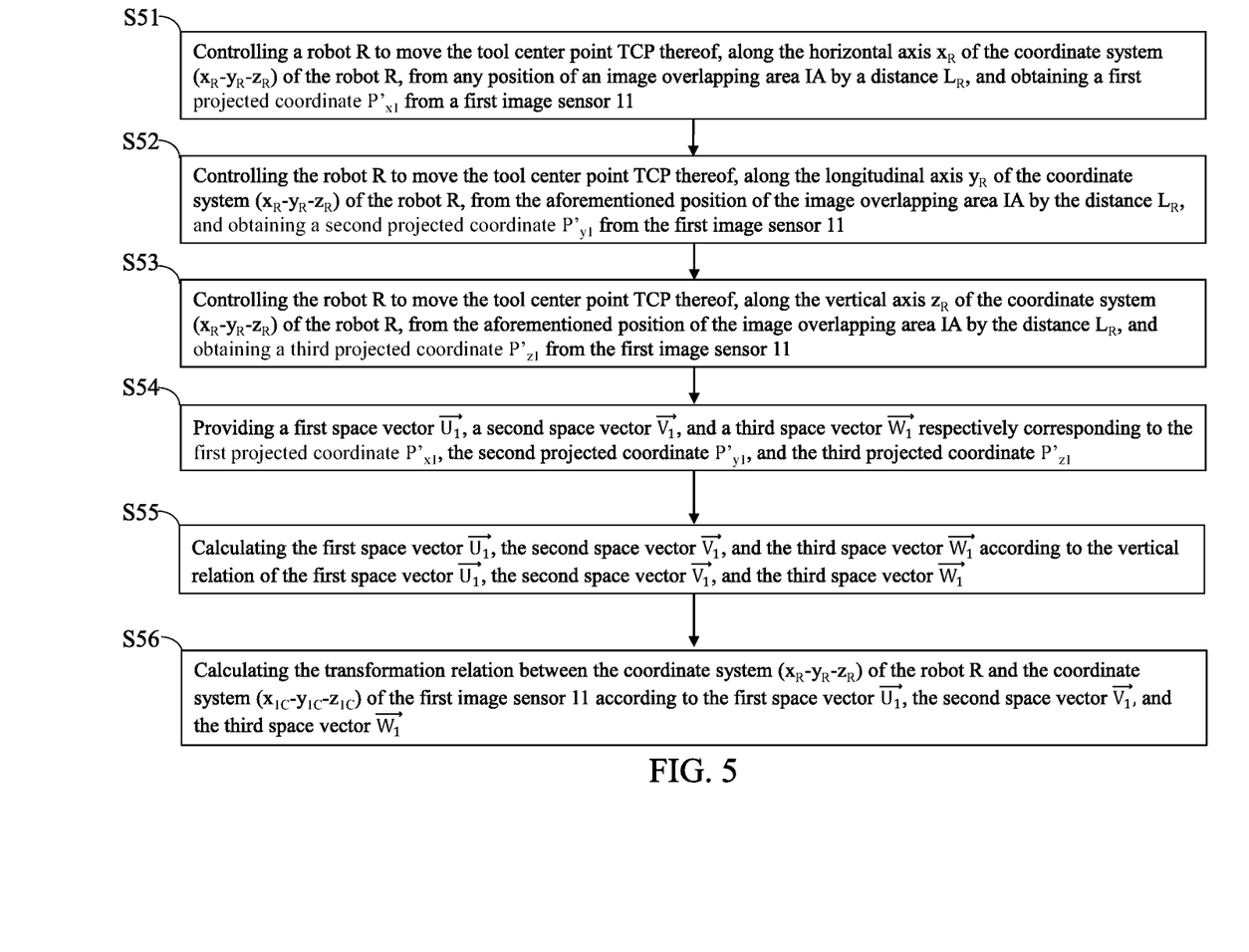
Figure 6:
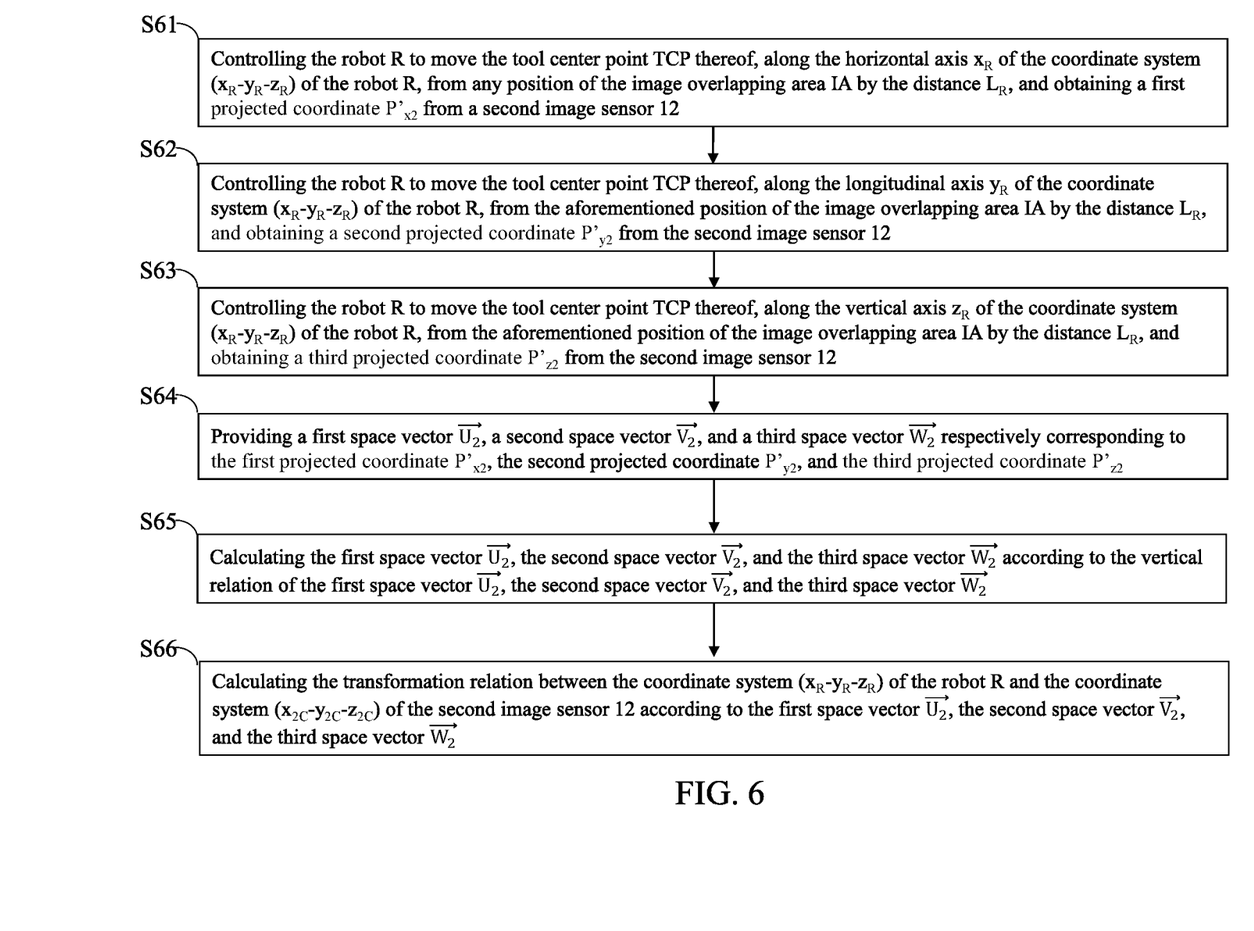
Figure 7:
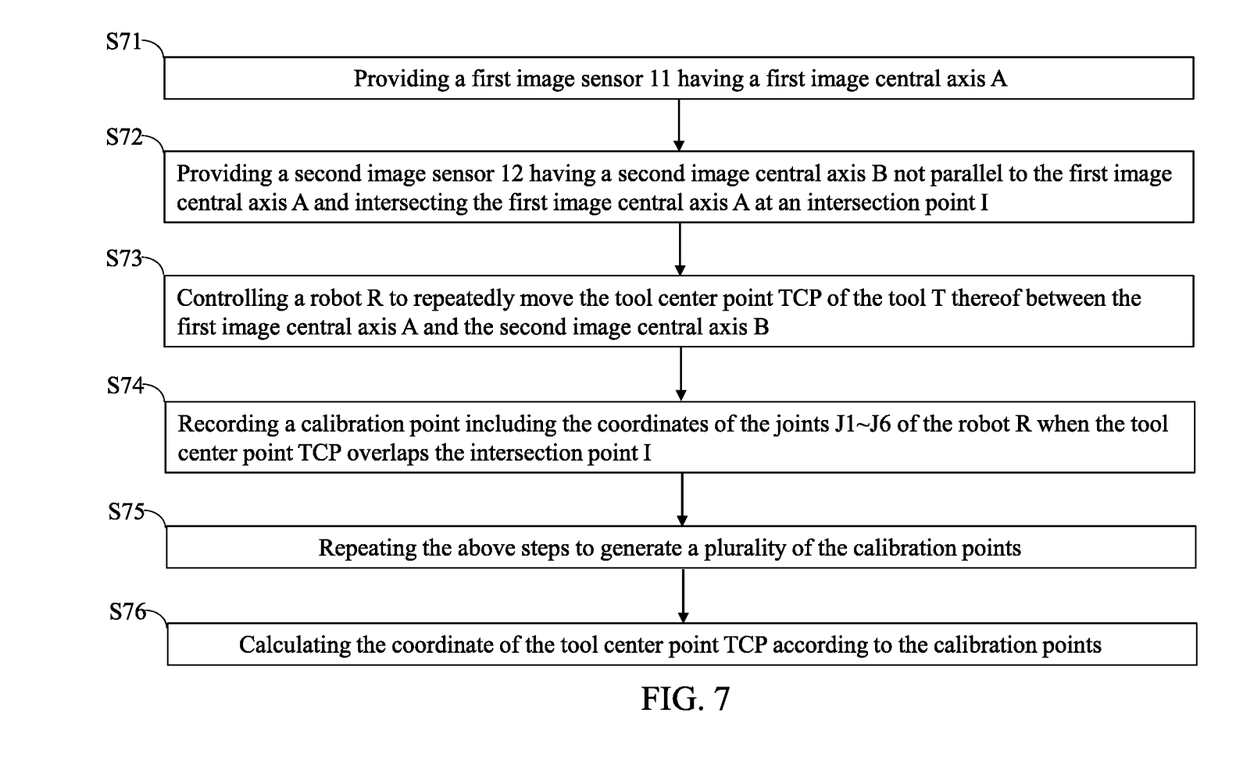

FIG. 5~FIG. 7 are from first to third flow charts of the first embodiment. As shown in FIG. 5, the method of obtaining the transformation relation between the coordinate system $(x_R\text{-}y_R\text{-}z_R)$ of the robot R and the coordinate system $(x_{1C}\text{-}y_{1C}\text{-}z_{1C})$ of the first image sensor 11 includes the following steps.

Step S51: Controlling a robot R to move the tool center point TCP thereof, along the horizontal axis $x_R$ of the coordinate system $(x_R\text{-}y_R\text{-}z_R)$ of the robot R, from any position of an image overlapping area IA by a distance $L_R$, and obtaining a first projected coordinate $P'_{x1}$ from a first image sensor 11.

Step S52: Controlling the robot R to move the tool center point TCP thereof, along the longitudinal axis $y_R$ of the coordinate system $(x_R\text{-}y_R\text{-}z_R)$ of the robot R, from the aforementioned position of the image overlapping area IA by the distance $L_R$, and obtaining a second projected coordinate $P'_{y1}$ from the first image sensor 11.

Step S53: Controlling the robot R to move the tool center point TCP thereof, along the vertical axis $z_R$ of the coordinate system $(x_R\text{-}y_R\text{-}z_R)$ of the robot R, from the aforementioned position of the image overlapping area IA by the distance $L_R$, and obtaining a third projected coordinate $P'_{z1}$ from the first image sensor 11.

Step S54: Providing a first space vector $\vec{u_1}$, a second space vector $\vec{v_1}$, and a third space vector $\vec{w_1}$ respectively corresponding to the first projected coordinate $P'_{x1}$, the second projected coordinate $P'_{y1}$, and the third projected coordinate $P'_{z1}$.

Step S55: Calculating the first space vector $\vec{u_1}$, the second space vector $\vec{v_1}$, and the third space vector $\vec{w_1}$ according to the vertical relation of the first space vector $\vec{u_1}$, the second space vector $\vec{v_1}$, and the third space vector $\vec{w_1}$.

Step S56: Calculating the transformation relation between the coordinate system $(x_R\text{-}y_R\text{-}z_R)$ of the robot R and the coordinate system $(x_{1C}\text{-}y_{1C}\text{-}z_{1C})$ of the first image sensor 11 according to the first space vector $\vec{u_1}$, the second space vector $\vec{v_1}$, and the third space vector $\vec{w_1}$, as shown in aforementioned Equation (4).

As shown in FIG. 6, the method of obtaining the transformation relation between the coordinate system $(x_R\text{-}y_R\text{-}z_R)$ of the robot R and the coordinate system $(x_{2C}\text{-}y_{2C}\text{-}z_{2C})$ of the second image sensor 12 includes the following steps.

Step S61: Controlling the robot R to move the tool center point TCP thereof, along the horizontal axis $x_R$ of the coordinate system $(x_R\text{-}y_R\text{-}z_R)$ of the robot R, from any position of the image overlapping area IA by the distance $L_R$, and obtaining a first projected coordinate $P'_{x2}$ from a second image sensor 12.

Step S62: Controlling the robot R to move the tool center point TCP thereof, along the longitudinal axis $y_R$ of the coordinate system $(x_R\text{-}y_R\text{-}z_R)$ of the robot R, from the aforementioned position of the image overlapping area IA by the distance $L_R$, and obtaining a second projected coordinate $P'_{y2}$ from the second image sensor 12.

Step S63: Controlling the robot R to move the tool center point TCP thereof, along the vertical axis $z_R$ of the coordinate system $(x_R\text{-}y_R\text{-}z_R)$ of the robot R, from the aforementioned position of the image overlapping area IA by the distance $L_R$, and obtaining a third projected coordinate $P'_{z2}$ from the second image sensor 12.

Step S64: Providing a first space vector $\vec{u_2}$, a second space vector $\vec{v_2}$, and a third space vector $\vec{w_2}$ respectively corresponding to the first projected coordinate $P'_{x2}$, the second projected coordinate $P'_{y2}$, and the third projected coordinate $P'_{z2}$.

Step S65: Calculating the first space vector $\vec{u_2}$, the second space vector $\vec{v_2}$, and the third space vector $\vec{w_2}$ according to the vertical relation of the first space vector $\vec{u_2}$, the second space vector $\vec{v_2}$, and the third space vector $\vec{w_2}$.

Step S66: Calculating the transformation relation between the coordinate system $(x_R\text{-}y_R\text{-}z_R)$ of the robot R and the coordinate system $(x_{2C}\text{-}y_{2C}\text{-}z_{2C})$ of the second image sensor 12 according to the first space vector $\vec{u_2}$, the second space vector $\vec{v_2}$, and the third space vector $\vec{w_2}$, as shown in aforementioned Equation (8).

As shown in FIG. 7, the method of the system 1 for calibrating tool center point of robot includes the following steps.

Step S71: Providing a first image sensor 11 having a first image central axis A.

Step S72: Providing a second image sensor 12 having a second image central axis B not parallel to the first image central axis A and intersecting the first image central axis A at an intersection point I.

Step S73: Controlling a robot R to repeatedly move the tool center point TCP of the tool T thereof between the first image central axis A and the second image central axis B.

Step S74: Recording a calibration point including the coordinates of the joints J1~J6 of the robot R when the tool center point TCP overlaps the intersection point I.

Step S75: Repeating the above steps to generate a plurality of the calibration points.

Step S76: Calculating the coordinate of the tool center point TCP according to the calibration points.

It is worthy to point out that the currently available technology for calibrating tool center point of robot may need a user to manually operate a robot in order to calibrate the tool center point of the robot, which tends to cause man-made errors. The users may not precisely calibrate the tool center point. Thus, the currently available technology for calibrating tool center point of robot tends to result in low calibration accuracy, high labor cost and time waste. On the contrary, the system 1 for calibrating tool center point of robot according to one embodiment of the present disclosure includes a controller 13 and image sensors 11, 12, and can automatically calibrate the tool center point TCP of a robot R via visual servo control, which can achieve high calibration accuracy, reduce labor cost and time waste.

Besides, the currently available technology for calibrating tool center point of robot may need additional measurement devices to calibrate the tool center point of the robot. However, these measurement devices should be also calibrated in advance, which increases not only labor cost and time waste, but also significantly increase the cost of the calibration instruments. On the contrary, the system 1 for calibrating tool center point of robot according to one embodiment of the present disclosure can automatically calibrate the tool center point TCP of the robot R by the controller 11 and the image sensors 11, 12 without calibrating the positions of the image sensors 11, 12 in advance, which can further reduce labor cost and time waste.

Moreover, the currently available technology for calibrating tool center point of robot may need the users to repeatedly calibrate the tool center point of the robot for several times, so it is inefficient in use. On the contrary, the system 1 for calibrating tool center point of robot according to one embodiment of the present disclosure can achieve high calibration accuracy just by performing the calibration process for only one time, so the system 1 can more efficiently calibrate the tool center point TCP of the robot R.

Further, the system 1 for calibrating tool center point of robot according to one embodiment of the present disclosure can be applied to various types of robots, so the system 1 is more flexible in use. As described above, the system 1 for calibrating tool center point of robot according to one embodiment of the present disclosure definitely has an inventive step.

Figure 8:
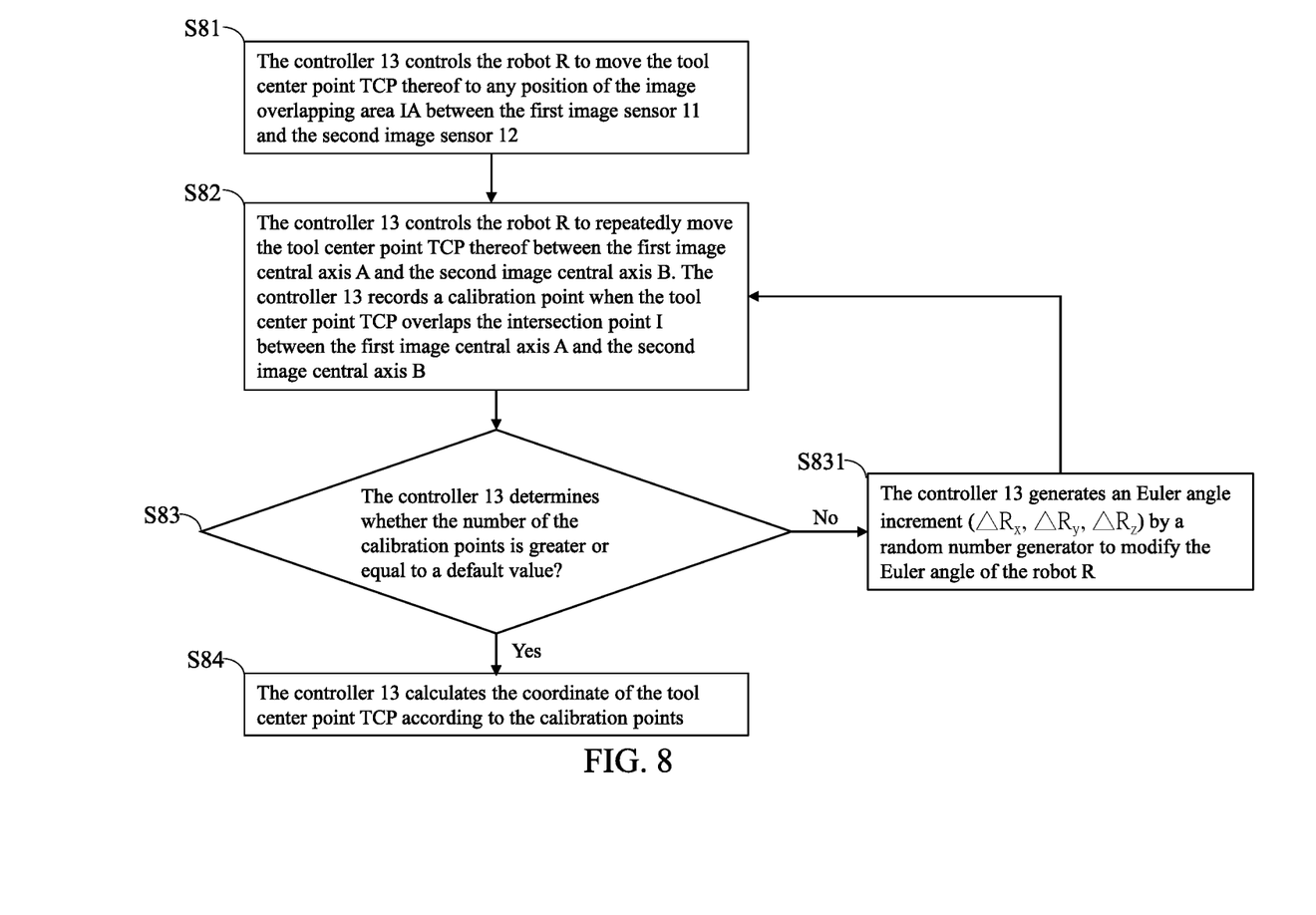
FIG. 8 is a flow chart of a system for calibrating tool center point of robot of a second embodiment in accordance with the present disclosure.

FIG. 8 is a flow chart of a system 1 for calibrating tool center point of robot of a second embodiment in accordance with the present disclosure. The embodiment illustrates the detailed steps that the system 1 calibrates the tool center point TCP of a robot R.

Step S81: The controller 13 controls the robot R to move the tool center point TCP thereof to any position of the image overlapping area IA between the first image sensor 11 and the second image sensor 12; then, the process proceeds to Step S82.

Step S82: The controller 13 controls the robot R to repeatedly move the tool center point TCP thereof between the first image central axis A and the second image central axis B. The controller 13 records a calibration point when the tool center point TCP overlaps the intersection point I between the first image central axis A and the second image central axis B; then, the process proceeds to Step S83.

Step S83: The controller 13 determines whether the number of the calibration points is greater or equal to a default value. If it is, the process proceeds to Step S84; it is not, the process proceeds to Step S831.

Step S831: The controller 13 generates an Euler angle increment ($\Delta R_x$, $\Delta R_y$, $\Delta R_z$) by a random number generator to modify the Euler angle of the robot R; then, the process returns to Step S82.

Step S84: The controller 13 calculates the coordinate of the tool center point TCP according to the calibration points.

In summation of the description above, the system 1 for calibrating tool center point of robot according to one embodiment of the present disclosure includes a controller and image sensors, and can automatically calibrate the tool center point of a robot via visual servo control, which can achieve high calibration accuracy, reduce labor cost and time waste.

Besides, the system 1 for calibrating tool center point of robot according to one embodiment of the present disclosure can automatically calibrate the tool center point of the robot by the controller and image sensors without calibrating the positions of the image sensors in advance, which can further reduce labor cost and time waste.

Moreover, the system 1 for calibrating tool center point of robot according to one embodiment of the present disclosure can achieve high calibration accuracy just by performing the calibration process for only one time, so the system can more efficiently calibrate the tool center point of the robot.

Further, the system 1 for calibrating tool center point of robot according to one embodiment of the present disclosure can be applied to various types of robots, so is more flexible in use.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A system for calibrating tool center points of a robot, comprising:
a first image sensor, comprising a first image central axis;
a second image sensor, comprising a second image central axis intersecting the first image axis at an intersection point, wherein a field of view of the second image sensor overlaps a field of view of the first image sensor to form an image overlapping area, and the first image central axis and the second image central axis are inside the image overlapping area; and
a controller, configured to control a robot to move a tool center point of a tool thereof from an initial point in the image overlapping area toward the first image central axis, and changes a moving direction of the tool center point so as to move the tool center point toward the second image central axis when the tool center point reaches the first image central axis, and changes the moving direction of the tool center point so as to move the tool center point toward the first image central axis when the tool center point reaches the second image central axis so as to repeatedly move the tool center point within the image overlapping area and between the first image central axis and the second image central axis until the tool center point overlaps the intersection point;
wherein the controller is configured to record a calibration point including coordinates of joints of the robot when the tool center point overlaps the intersection point, and the controller is configured to move the tool center point and change a posture of the robot and repeat the above steps to generate a plurality of the calibration points in order to calculate a coordinate of the tool center point according to the calibration points.

2. The system for calibrating tool center points of the robot of claim 1, wherein the controller controls the robot according to a first transformation relation between a coordinate system of the first image sensor and a coordinate system of the robot, a second transformation relation between a coordinate system of the second image sensor and the coordinate system of the robot, and images of the first image sensor and the second image sensor.

3. The system for calibrating tool center points of the robot of claim 1, wherein the coordinate of each joint is a rotation angle of the joint rotating relatively to a default initial point.

4. The system for calibrating tool center points of the robot of claim 3, wherein the controller calculates the coordinate of the tool center point according to the calibration points and a link rod parameter of the robot.

5. The system for calibrating tool center points of the robot of claim 1, wherein a number of the calibration points is greater or equal to a default value.

6. The system for calibrating tool center points of the robot of claim 5, wherein when the number of the calibration points is less than 3, the controller generates an Euler angle increment by a random number generator to modify an Euler angle of the robot in order to change a posture of the robot.

7. The system for calibrating tool center points of the robot of claim 6, wherein after the controller modifies the Euler angel of the robot, the controller controls the robot to repeatedly move the tool center point between the first image central axis and the second image central axis in order to overlap the intersection point so as to generate next calibration points until the number of the calibration points is greater or equal to the default value.

8. The system for calibrating tool center points of the robot of claim 1, wherein when the tool center point overlaps the intersection point between the first image central axis and the second image central axis, a first distance between the tool center point and the first image central axis and a second distance between the tool center point and the second image central axis are less than a threshold value.

9. The system for calibrating tool center points of the robot of claim 1, wherein the controller generates the calibration points by different postures of the robot.

10. The system for calibrating tool center points of the robot of claim 1, wherein the coordinate of the tool center point comprises a coordinate of the tool center point in relation to a base of the robot, or a coordinate of the tool center point in relation to a flange facing of the robot.

11. The system for calibrating tool center points of the robot of claim 1, wherein the first image central axis is perpendicular to the second image central axis.

12. A method for calibrating tool center points of a robot, comprising:
providing a first image sensor having a first image central axis;
providing a second image sensor having a second image central axis not parallel to the first image central axis and intersecting the first image central axis at an intersection point, wherein a field of view of the second image sensor overlaps a field of view of the first image sensor to form an image overlapping area, and the first image central axis and the second image central axis are inside the image overlapping area;

controlling a robot to move a tool center point of a tool thereof from an initial point in the image overlapping area toward the first image central axis, and change a moving direction of the tool center point so as to move the tool center point toward the second image central axis when the tool center point reaches the first image central axis, and change the moving direction of the tool center point so as to move the tool center point toward the first image central axis when the tool center point reaches the second image central axis so as to repeatedly move the tool center point within the image overlapping area and between the first image central axis and the second image central axis until the tool center point overlaps the intersection point, and recording a calibration point including coordinates of joints of the robot;

moving the tool center point, changing a posture of the robot, and repeating the above steps to generate a plurality of the calibration points; and calculating a coordinate of the tool center point according to the calibration points.

13. The method for calibrating tool center points of the robot of claim 12, wherein the step of controlling the robot to repeatedly move the tool center point of the tool thereof between the first image central axis and the second image central axis until the tool center point overlaps the intersection point, and recording the calibration point including the coordinates of the joints of the robot further comprises the following step:

providing a first transformation relation between a coordinate system of the first image sensor and a coordinate system of the robot, and a second transformation relation between a coordinate system of the second image sensor and the coordinate system of the robot; and controlling the robot to move the tool center point according to the first and second transformation relations and images of the first image sensor and the second image sensor.

14. The method for calibrating tool center points of the robot of claim 13, wherein the step of providing the first transformation relation between the coordinate system of the first image sensor and the coordinate system of the robot, and the second transformation relation between the coordinate system of the second image sensor and the coordinate system of the robot further comprises following steps:

controlling the robot to move the tool center point, along a horizontal axis of the coordinate system of the robot, from any position of the image overlapping area between the first image sensor and the second image sensor by a distance, and obtaining a first projected coordinate from the first image sensor and the second image sensor;

controlling the robot to move the tool center point, along a longitudinal axis of the coordinate system of the robot, from the position by the distance, and obtaining a second projected coordinate from the first image sensor and the second image sensor; and controlling the robot to move the tool center point, along a vertical axis of the coordinate system of the robot, from the position by the distance, and obtaining a third projected coordinate from the first image sensor and the second image sensor.

15. The method for calibrating tool center points of the robot of claim 14, wherein the step of providing the first transformation relation between the coordinate system of the first image sensor and the coordinate system of the robot, and the second transformation relation between the coordinate system of the second image sensor and the coordinate system of the robot further comprises following steps:

providing a first space vector, a second space vector, and a third space vector respectively corresponding to the first projected coordinate, the second projected coordinate, and the third projected coordinate;

calculating the first space vector, the second space vector, and the third space vector according to a vertical relation of the first space vector, the second space vector, and the third space vector; and calculating the first transformation relation between the coordinate system of the first image sensor and the coordinate system of the robot, and the second transformation relation between the coordinate system of the second image sensor and the coordinate system of the robot according to the first space vector, the second space vector, and the third space vector.

16. The method for calibrating tool center points of the robot of claim 12, wherein the coordinate of each joint is a rotation angle of the joint rotating relatively to a default initial point.

17. The method for calibrating tool center points of the robot of claim 16, wherein the step of calculating the coordinate of the tool center point according to the calibration points further comprises a following step:

calculating the coordinate of the tool center point according to the calibration points and a link rod parameter of the robot.

18. The method for calibrating tool center points of the robot of claim 12, wherein a number of the calibration points is greater or equal to a default value.

19. The method for calibrating tool center points of the robot of claim 12, wherein the step of controlling the robot to repeatedly move the tool center point of the tool thereof between the first image central axis and the second image central axis until the tool center point overlaps the intersection point, and recording the calibration point including the coordinates of the joints of the robot further comprises following steps:

controlling the robot to repeatedly move the tool center point until a first distance between the tool center point and the first image central axis and a second distance between the tool center point and the second image central axis are less than a threshold value.

20. The method for calibrating tool center points of the robot of claim 19, wherein the step of controlling the robot to repeatedly move the tool center point of the tool thereof between the first image central axis and the second image central axis until the tool center point overlaps the intersection point, and recording the calibration point including the coordinates of the joints of the robot further comprises a following step:

generating an Euler angle increment by a random number generator to modify an Euler angle of the robot in order to change a posture of the robot when a number of the calibration points is less than 3.

21. The method for calibrating tool center points of the robot of claim 20, further comprising a following step:

controlling the robot to repeatedly move the tool center point between the first image central axis and the second image central axis to generate next calibration point after the Euler angle of the robot is modified until the number of the calibration points is greater or equal to a default value.

22. The method for calibrating tool center points of the robot of claim 12, wherein the step of moving the tool center point, and repeating the above steps to generate a plurality of the calibration points further comprises a following step:
   generating the calibration points by different postures of the robot.

23. The method for calibrating tool center points of the robot of claim 12, wherein the coordinate of the tool center point comprises a coordinate of the tool center point in relation to a base of the robot, or a coordinate of the tool center point in relation to a flange facing of the robot.

24. The method for calibrating tool center points of the robot of claim 12, wherein the first image central axis is perpendicular to the second image central axis.

* * * * *